United States Patent [19]

Smith et al.

[11] Patent Number: 4,591,130
[45] Date of Patent: May 27, 1986

[54] GROUND ROLLER

[75] Inventors: Karl E. Smith, Bessemer; Wei-Chung Lin, Pelham, both of Ala.

[73] Assignee: Bethea Electrical Products, Inc., Pelham, Ala.

[21] Appl. No.: 710,612

[22] Filed: Mar. 11, 1985

[51] Int. Cl.⁴ ............................................ B65M 59/22
[52] U.S. Cl. ........................................ 254/134.3 PA
[58] Field of Search .............. 254/134.3 PA, 134.3 R; 174/5–7

[56] References Cited

U.S. PATENT DOCUMENTS

| | | | |
|---|---|---|---|
| 3,545,724 | 12/1970 | Wright | 254/134.3 PA |
| 3,720,399 | 3/1973 | Bozeman | 254/134.3 PA |
| 3,844,536 | 10/1974 | Chadwick | 254/134.3 PA |
| 4,039,141 | 8/1977 | Lindsey | 254/134.3 PA |
| 4,093,183 | 6/1978 | Lindsey | 254/134.3 PA |

Primary Examiner—Robert C. Watson
Attorney, Agent, or Firm—Jennings, Carter, Thompson & Veal

[57] ABSTRACT

A ground roller assembly for a bundle conductor stringing block utilizes a plurality of independently mounted grounding sheaves which are individually resiliently biased upwardly to engage an associated conductor. The plurality of independently mounted sheaves form an assembly which is connected by a mounting bar which extends between two upwardly biased support arms to position the ground roller assembly proximal the periphery of the conductor stringing block to engage the conductors. The support arms are upwardly biased such that the entire assembly pivots downwardly about the periphery of the stringing block upon proper engagement of all of the conductors within their associated grounding sheaves.

6 Claims, 7 Drawing Figures

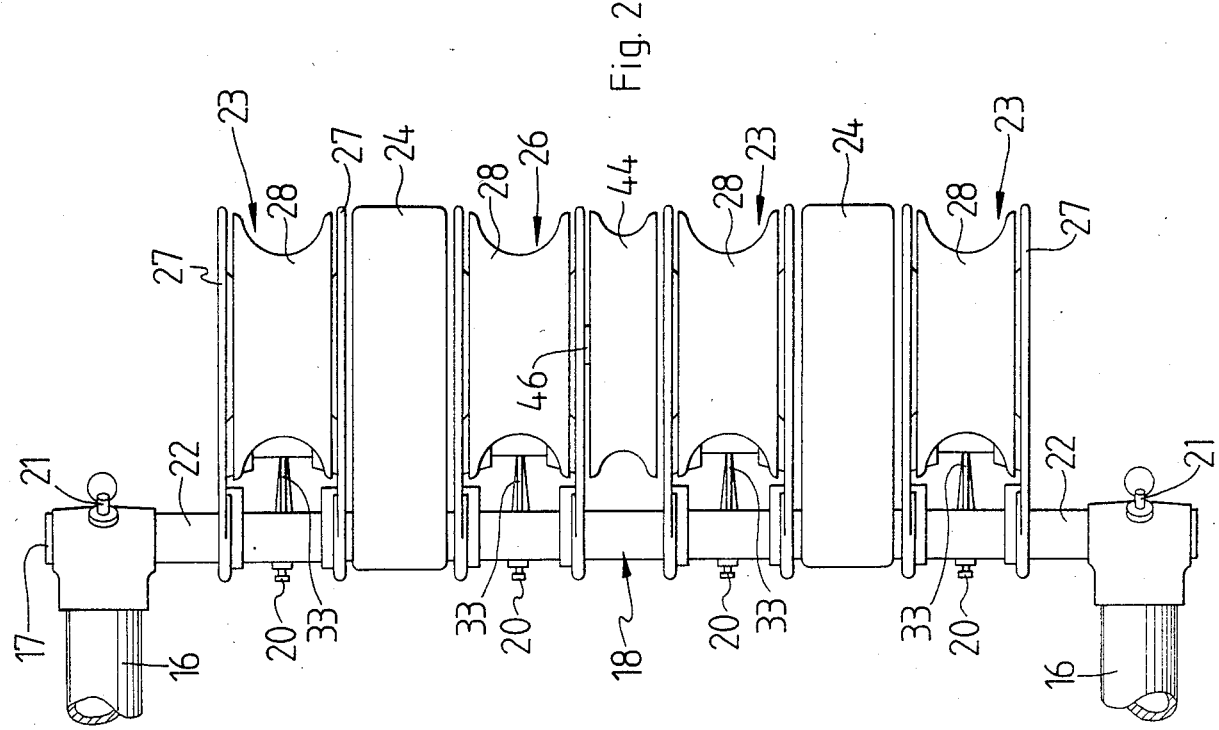
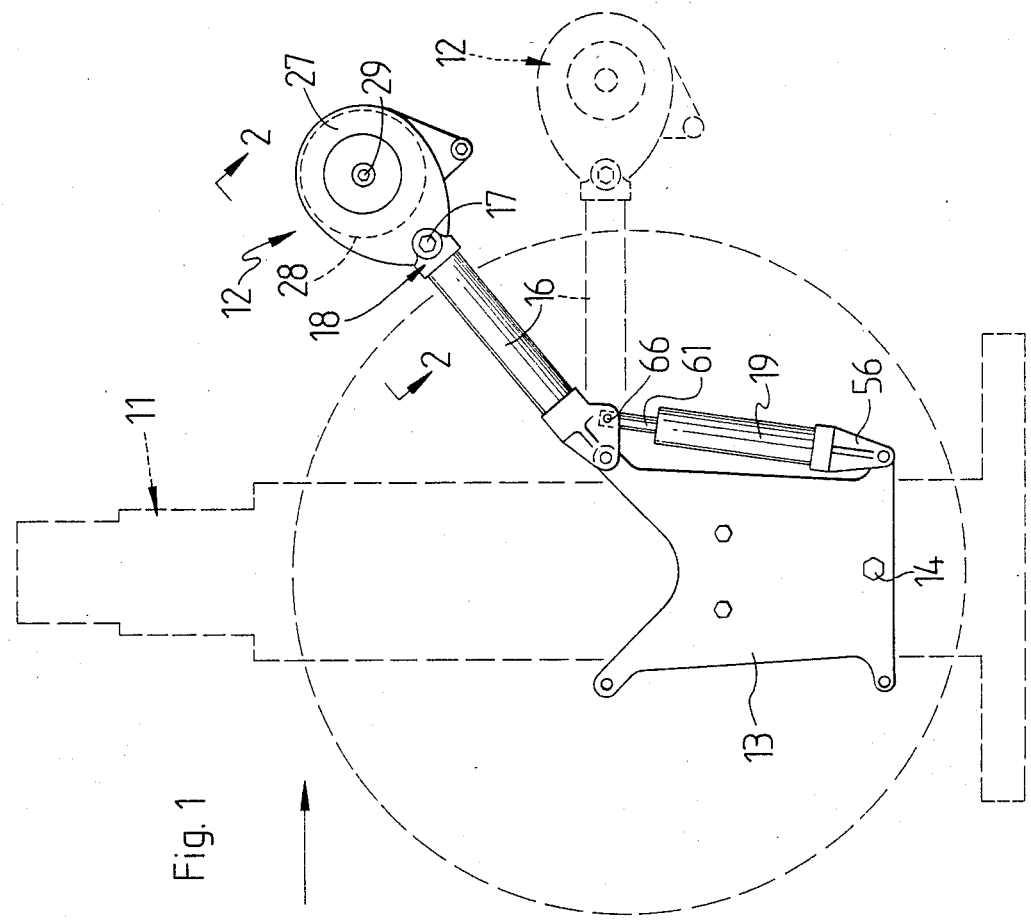
Fig. 1
Fig. 2

GROUND ROLLER

BACKGROUND OF THE INVENTION

This invention relates in general to stringing equipment for electrical conductors and more particularly to apparatus for grounding the conductors during conductor stringing operations.

As is well known, the stringing of single or a plurality of electrical conductors on electrical transmission towers oftentimes results in an induced charge being carried by the conductors as they are strung. This charge may arise due to static electricity, lightning, close proximity to existing power lines or other sources; however, it is nonetheless a dangerous and potentially fatal occurrence. Most conductor stringing block sheaves are lined with an elastomer which is non-conductive. It is, therefore, necessary to ground the conductor stringing blocks or in some manner to ground the conductor as it is passed through the block, thereby alleviating such hazardous conditions. Prior attempts at solving this problem are exemplified by U.S. Pat. Nos. 3,720,399 and 3,844,536. Both of these patents show auxiliary metallic rollers mounted proximal to the periphery of the sheaves of a stringing block so as to come into and remain in electrical contact with a plurality of electrical conductors being strung through the block. Both of these patents teach the use of a common ground roller shaft mounted on a pair of support arms which extend from the main frame of the block. Rotatably mounted on the common shaft is a plurality of ground rollers which are aligned with the conductor sheaves found in the block. Inasmuch as the conductors exhibit varying degrees of sag as they are being strung, it is necessary to allow the ground rollers to position themselves at various heights to insure adequate electrical contact between the roller and the conductor for the purpose of grounding the conductor. As noted the above mentioned patents both use a common shaft for all of the ground rollers. This common shaft is articulated at each end within the support arms such that the shaft may tilt when one end of the shaft is under a greater load than the other end thereof whereby the unloaded end is forced upwards and into contact with its associated conductor by the weight of the conductor lying across the other end. The U.S. Pat. No. 3,844,536 goes a step further and provides an eccentric bearing means between the roller shaft and the rollers. Two or more rollers are coupled by the eccentric bearing such that a weight disposed upon one of the rollers is transferred through the eccentric bearing to the coupled roller in order to position the coupled roller in contact with its associated conductor. It can readily be seen by a study of the construction of the devices that the interdependent structural mounting of these ground rollers inherently limits the motion capabilities of the individual ground rollers and therefore limits the ability of the ground rollers to maintain constant contact with the conductors thereby allowing the possibility for the conductor to be out of contact with the ground roller and therefore ungrounded.

SUMMARY OF THE INVENTION

It is an object of the present invention to provide for independent conductor contact for each ground roller in the assembly.

It is another object of the invention to provide a ground roller assembly which will maintain contact with each individual conductor even after the entire assembly is fully loaded and distended to its operable position.

These objects of our invention are advantageously accomplished through the use of a plurality of ground rollers corresponding in number to the conductor sheaves mounted on the stringing block, with each ground roller having its own independent shaft and its own independent biasing means, such that the weight of the conductor bearing on any one ground roller is independent and irrelevant insofar as the positioning of any other ground roller is concerned. The ground rollers are all carried by a single mounting bar to which the ground rollers are independently pivotally connected and about which each ground roller is independently biased for pivotal motion. The mounting bar is carried by a pair of pivotally connected support arms which are connected to the main frame of the stringing block. The support arms are themselves resiliently biased upwardly such that the mounting bar and ground roller assembly will descend to its normal operating position only after all of the conductors are engaged on the ground rollers.

DESCRIPTION OF THE DRAWINGS

Apparatus illustrating features of our invention are shown in the accompanying drawings forming a part of this application wherein:

FIG. 1 is a side elevational view of a conductor stringing block having, my improved ground roller assembly attached thereto;

FIG. 2 is a plan view of the ground roller assembly;

Figure 4:
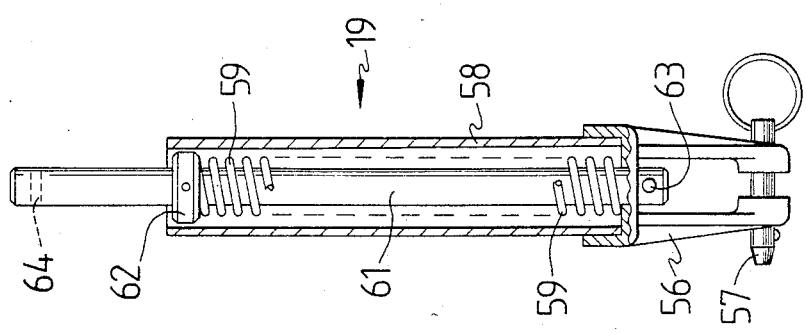

FIGS. $3^a$ and $3^b$ are partial sectional views showing the ground roller mounted on the mounting bar and the interaction of the spring arm bushing with the ground roller frame;

FIG. 4 is a side elevational view partly broken away and in section showing one embodiment of the biasing means for the support arm;

FIG. $5^a$ is a side elevational view showing a second embodiment of the biasing means for the support arms; and FIG. $5^b$ is a front elevational view taken along line $5^b$—$5^b$ of FIG. $5^a$.

DESCRIPTION OF A PREFERRED EMBODIMENT

Referring to FIG. 1 a bundle conductor stringing block 11, shown by the dotted line representation, has attached thereto our improved ground roller assembly shown generally at 12 which provides for independent contact with each conductor being strung by the bundle conductor stringing block 11. The ground roller assembly 12 is connected to the stringing block 11 by an attachment plate 13 secured to each vertical side member of the stringing block 11. The ground roller assembly 12 may be mounted on either the right or left side of the stringing block 11, as shown in FIG. 1. The attachment plate 13 has mounted thereon a grounding lug 14 to which a grounding conductor is attached in the conventional manner whereby any induced electrical charges are shunted to ground via the supporting tower or other conventional means. Pivotally mounted to the attachment plate 13 are a pair of support arms 16 which carry a hexagonal rod forming a mounting bar 17 to which is mounted a mounting bar assembly 18. The support arms 16 are resiliently biased upwards by individually mounted spring arm assemblies 19.

Referring to FIG. 2, the support arm 16 carry the mounting bar 17 therebetween and are secured thereto by a pair of mounting bar pins 21 which are inserted through the ends of the support arms 16 and through the ends of the mounting bar 17, such that the mounting bar is rigidly affixed to the support arms. Co-axially mounted on the mounting bar 17 adjacent the ends thereof and adjacent the supporting arms 16 are a pair of spacers 22 which separate the support arms from a first ground roller sub-assembly 23. The number of ground roller subassemblies 23 is dependent upon the number of conductors in the bundle to be strung and is, of course, equal to the number of conductor-carrying sheaves on the conductor stringing block 11. Each pair of ground roller sub-assemblies 23 is separated by a ground roller spacer 24. A centrally aligned double sheave ground roller sub-assembly 26 is utilized to carry a sheave 44 for the lead line used to thread the conductors through the stringing block 11.

Figure 3B:
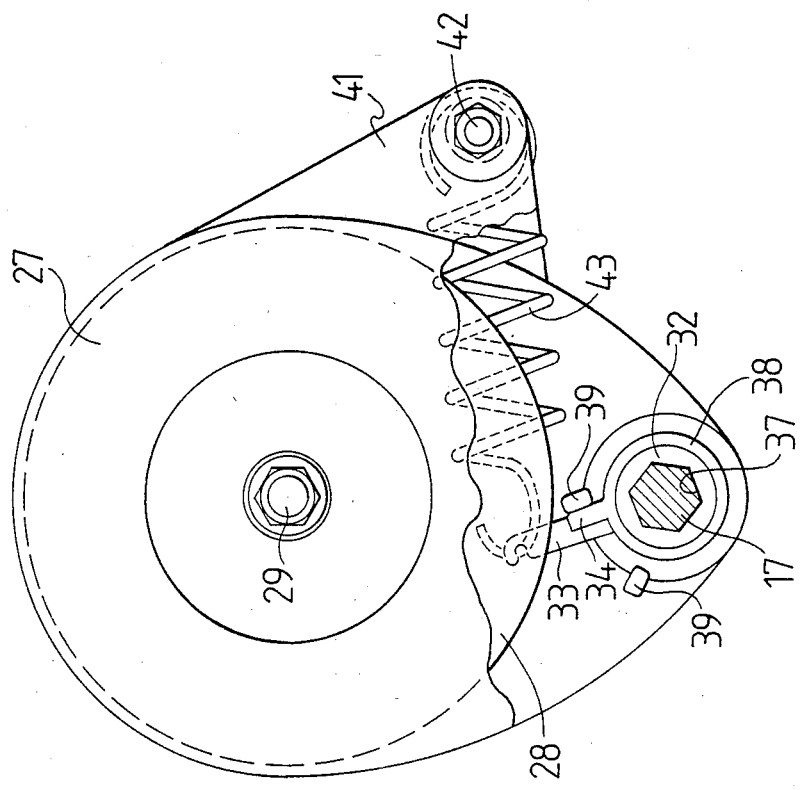
Figure 3A:
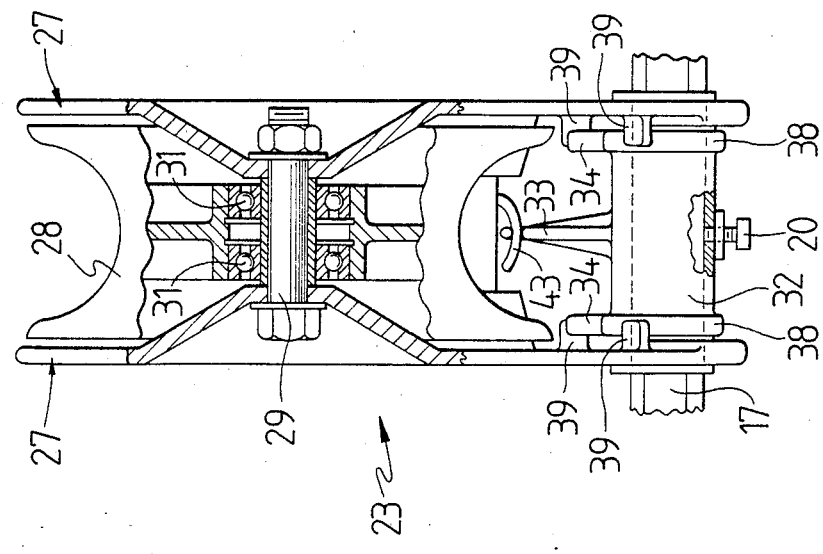

Referring to FIGS. 3$^a$ and 3$^b$, the ground roller sub-assembly is shown in section and in elevation, respectively. Each ground roller sub-assembly 23 has a support frame 27 which carries a polished aluminum grounding sheave 28, such as the seven-inch universal roller manufactured by Bethea Electrical Products, Inc., of Birmingham, Ala., which serves as the electrically conductive ground roller for such conductors. Each grounding sheave 28 is carried by an independent roller shaft 29 and rotatably mounted thereon as with ball bearings 31. Each ground roller sub-assembly 23 is mounted on a spring arm bushing 32 which is coaxially mounted on the mounting bar 17. This bushing 32 has a radially extending spring arm 33 and a pair of radially extending tabs 34 aligned with the spring arm 33 with one of the tabs 34 being disposed near each end of the spring arm bushing 32, as shown in FIG. 3$^a$. The bushing 32 is affixed to the mounting bar 17 by means of a set screw 20 threadedly engaging the bushing and urged against one of the hexagonal sides of the mounting bar 17. The bushing 32 has a hexagonal, axially extending opening 37 therein which receives the mounting bar 17. An annular flange 38 also circumscribes the bushing adjacent each of the radial tabs 34, as shown. The support frame 27 has a portion thereof surrounding the cylindrical outer surface of the bushing 32 outwardly of the annular flanges 38 and the radial tabs 34. On the inner wall of the support frame 27 proximal the bushing 32 are a pair of angularly spaced stops 39 which extend inwardly of the frame 27 such that the stops 39 bracket the tabs 34 whereby each stop 39 may engage the adjacent side of one of the radial tabs 34 to limit angular motion of the frame 27 about the mounting bar 17.

The support frame 27 carries a spring clevis 41 which has mounted therein a spring bar 42 to which is attached one end of a tension spring 43. The other end of the tension spring 43 is attached to the spring arm 33 of spring arm bushing 32. The tension spring 43 normally biases the support frame 27 upwards about the mounting bar 17 and thereby urges the grounding sheave 28 into contact with the associated conductor. This mounting arrangement allows for independent relative motion of the support frames 27 and the grounding sheaves 28 for each conductor in response to individual variations in motion of the conductors as the conductors traverse the stringing block 11. Thus upon initial engagement with the conductors, one of the conductors may engage its associated ground roller sub-assembly and overcome the bias presented by the spring 43 such that its ground roller sub-assembly pivots about the mounting bar 17, while the other conductors may not have engaged the grounding sheave of their respective ground roller sub-assemblies 23 and thus these support frames 27 and grounding sheaves 28 remain in their normal upwardly biased positions awaiting contact with the conductors. When all of the conductors have been properly seated in their associated ground roller sub-assemblies, the support arms 16 pivot downwardly to the normative load-bearing position.

The double sheave ground roller sub-assembly 26 provides a sheave for engaging the lead line prior to the conductors being drawn through the stringing block 11. The additional sheave 44 is mounted axially outwardly of the support frame 27 on a common shaft with one of the conductor carrying ground roller sub-assemblies 23. A spacer 46 coaxially mounted on this extended common roller shaft maintains the ground roller sheave 44 in its proper axial position relative to the conductor sheaves. Since this ground roller sheave 44 is normally centrally located on the ground roller assembly, it is placed intermediate two ground roller sub-assemblies 23 such that no ground roller spacer is required between the innermost pair of ground roller sub-assemblies 23 although a mounting bar spacer 25 is positioned on the mounting bar 17 in alignment with the sheave 44.

Referring to FIGS. 1 and 4, the spring arm assembly 19 engages the support arms 16 and urges them upwardly to their position illustrated in solid lines in FIG. 1 until the conductors are completely engaged by the ground roller sub-assembly whereupon the support arms and the ground roller sub-assembly 18 swing downwardly. This downward movement is countered by the spring arm 19 with an increase in the biasing force exerted upon the support arm; however this increased upward biasing force is compensated by the decrease in the effective length of the moment arm of the support arm 16 and mounting bar assembly 18 such that the biasing force exerted on the mounting bar assembly 18 is substantially constant regardless of the position of the support arms 16 as is well known in the positioning of ground rollers. The spring arm assembly 19 has a lower weldment 56 pivotally connected to the attachment plate 13 by a ball detent pin 57 and which is attached to a spring arm housing 58. Spring arm housing 58 encases a compression spring 59 through which there extends an axial compression shaft 61. Compression shaft 61 carries a compression collar 62 affixed thereto such that motion of the compression shaft 61 inwardly of the housing 58 towards the lower weldment 56 compresses the compression spring 59. A stop pin 63 attached at the lowermost end of the compression shaft 61 prevents the compression shaft 61 and compression spring 59 from being withdrawn from the compression housing 58. The upper end of the compression shaft 61 has a transverse bore 64 which carries a connecting pin 66 which connects the spring arm assembly to its support arm 16.

Figure 5B:
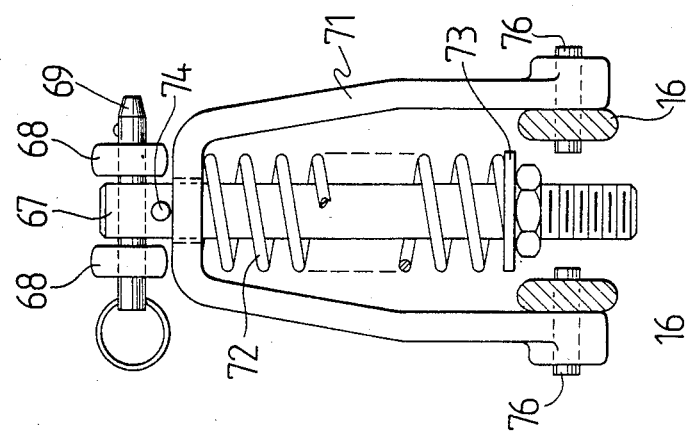
Figure 5A:
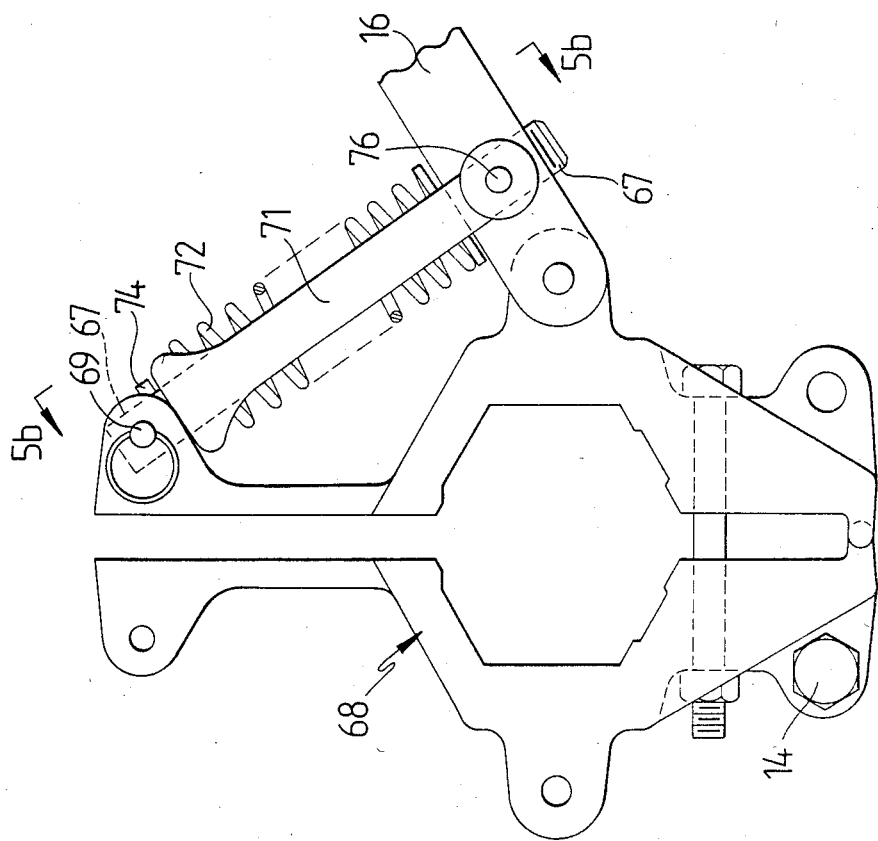

An alternative spring arm assembly is shown in FIGS. 5$^a$ and 5$^b$. A compression shaft 67 is pivotally mounted to an adapter plate 68 by a ball detent pin 69 at an elevation above the support arm 16. A spring retainer yoke 71 is slidably mounted on the compression shaft 67. A compression spring 72 is coaxially mounted on the compression shaft 67 beneath the spring retainer yoke 71 and held in place by a stop member or compression collar 73 which may be in the form of a flat washer and hex nut threaded onto the compression shaft 67.

The compression spring 72 is thus captured between the spring retainer yoke 71 and the collar 73. The range of motion of the yoke may be limited by a stop pin 74 mounted transversely of the compression shaft 67. The support arm 16 is connected to the spring retainer yoke 71 by a pair of spring pins 76. It should be noted that in either embodiment of the spring arm assembly the support arm 16 serves to compress the compression spring when the full weight of all the conductors is borne by the mounting bar assembly 18.

In operation a conductor lead line is threaded through the bundle block 11 in a direction indicated by the arrow. This conductor lead line engages the central sheave on the bundle stringing block and also engages the central sheave 44 on the ground roller assembly. Such pulling lines are typically ligntweight, weighing thirty to forty pounds, and do not cause appreciable motion of the entire assembly 12; however the weight borne by the central sheave 44 may be sufficient to cause some rotational movement of the double sheave ground roller sub-assembly 26. Of greater importance, in terms of safety and the induced voltage, are the conductors which follow the lead line through stringing block 11. As noted hereinabove, large voltages may be induced in these conductors unless they are properly grounded at all times during the stringing operation. As the conductors pass through the stringing block 11 they sag toward the mounting bar assembly 18. Each individual conductor is provided with a ground roller sub-assembly 23 and as each conductor comes in contact with the associated sub-assembly 23 the weight of the conductor causes the ground roller support frame 27 to rotate about the mounting bar 17 in opposition to the spring 43. Thus a slight upward variation in the position of the conductor, such as might be induced by the motion of the stringing apparatus, typically a helicopter, will cause the ground roller sub-assembly 23 to move upwards to maintain engagement with the conductor. Thus each conductor in the bundle is individually supported on its independently mounted ground roller sub-assembly such that variations in movement among the conductors will not result in any one conductor becoming displaced from its associated ground roller sub-assembly and thereby becoming ungrounded. When all of the conductors have been engaged by their individual ground roller sub-assemblies 23 or 26, as the case may be, and all of the springs 43 have been extended such that the upper stop 39 on the support frames 27 have engaged the tabs 34 on the spring arm bushing 32, the weight of the conductors is directly transferred to the support arm 16 and the support arm 16 pivots downwardly to its normal operating position. Note that in the normal operating position, if the downward force on an individual ground roller assembly is decreased, as by a partial lifting of the conductor from the ground roller sub-assembly, then the individual spring 43 would cause the frame of the associated ground roller sub-assembly 23 to rotate about the mounting bar 17 so as to maintain engagement with the conductor. Thus it should be seen that our improved ground roller assembly provides for independent contact with each conductor in the bundle at the initial engagement of the conductors with the ground roller assembly and also subsequently when the support arms 16 have moved the ground roller sub-assemblies 23 to the normal operating position. While it is true that the pivotal motion of the support arm 16 is dependent upon the weight of all of the conductors to be borne by the ground roller sub-assemblies 23, it should be noted that should any one conductor become disengaged from its ground roller sub-assembly 23 the resultant decrease in weight on the support arms would cause the spring arms 19 to urge the support arms 16 upward to their initial position thereby reengaging the errant conductor, thus assuring that each of the conductors in the bundle is positively engaged by the ground roller assembly independently of the engagement of the other conductors with the ground roller assembly.

While we have shown our invention in several forms, it will be obvious to those skilled in the art that it is not so limited, but is susceptible of various other changes and modifications without departing from the spirit thereof.

What we claim is:

1. In a bundle conductor stringing block having a main frame including vertically extending side members supporting a horizontal shaft having mounted thereon a plurality of conductor stringing sheaves in axial alignment with a centrally disposed hauling line sheave, a grounding apparatus comprising:

(a) a pair of pivotally mounted support arms resiliently mounted to said main frame outwardly of said sheaves;

(b) a mounting rod mounted non-rotatably between said support arms proximal the periphery of said sheaves; and (c) a plurality of ground rollers, each independently pivotally mounted on said mounting rod and including a support frame pivotally mounted on said mounting rod, a roller shaft supported in said frame parallel to said mounting rod, and an electrically conductive sheave rotatably mounted on said roller shaft and corresponding to each of said conductor stringing sheaves, with each of said ground rollers being resiliently upwardly biased to engage an associated conductor through the use of a bushing mounted non-rotatably on said mounting rod internally of said support frame, said bushing having a pair of radially extending tabs thereon adjacent said support frame and said bushing also having formed thereon a radially extending spring arm, said support frame having formed thereon inwardly facing angularly spaced apart stops adjacent said mounting bar and bracketing said tabs for limiting the pivotal motion of said support frame, a spring mounting projection formed on said support frame and extending perpendicular to said shaft and rod, and a tension spring attached at one end to said projection and at the other end to said spring arm and urging said frame upwards.

2. In a bundle conductor string block having a main frame including vertically extending side members supporting a horizontal shaft having mounted thereon a plurality of conductor stringing sheaves in axial alignment with a centrally disposed hauling line sheave, a grounding apparatus comprising:

(a) a pair of pivotally mounted support arms resiliently mounted to said main frame outwardly of said sheaves by compression shafts pivotally attached to said support arms proximal said main frame, a compression collar affixed to each of said compression shafts, spring arm housings each being pivotally mounted at one end to said main frame at an elevation below said support arms and having an axial opening at the other end for receiving said compression shaft and said collar therewithin, and a compression spring coaxially mounted on each said compression shaft within said housing and engaging said collar proximal said other end of said housing;

(b) a mounting rod mounted non-rotatably between said support arms proximal the periphery of said sheaves; and (c) a plurality of ground rollers independently pivotally mounted on said mounting rod and corresponding to each of said conductor stringing sheaves with each of said ground rollers being resiliently upwardly biased to engage an associated conductor.

3. In a bundle conductor stringing block having a main frame including vertically extending side members supporting a horizontal shaft having mounted thereon a plurality of conductor stringing sheaves in axial alignment with a centrally disposed hauling line sheave, a grounding apparatus comprising:

(a) a pair of pivotally mounted support arms resiliently mounted to said main frame outwardly of said sheaves by compression shafts pivotally mounted to said main frame at an elevation above said support arms, a yoke slidably engaging each of said compression shafts and pivotally connected to said support arms proximal said main frame, a stop member affixed to each of said shafts proximal the free ends thereof and a compression spring coaxially mounted on each of said shafts between said yoke and said stop member;

(b) a mounting rod mounted non-rotatably between said support arms proximal the periphery of said sheaves; and (c) a plurality of ground rollers independently pivotally mounted on said mounting rod and corresponding to each of said conductor stringing sheaves with each of said ground rollers being resiliently upwardly biased to engage an associated conductor.

4. In a conductor bundle stringing block having a main frame which supports a horizontal shaft having mounted thereon a plurality of conductor stringing sheaves in axial alignment with a centrally disposed hauling line sheave, a grounding apparatus comprising:

(a) a pair of support arms pivotally mounted to said main frame and extending outwardly beyond the periphery of said sheaves;

(b) means for resiliently biasing said support arms upwardly including compression shafts pivotally attached to said support arms proximal said main frame, a compression collar affixed to each of said compression shafts, spring arm housings pivotally mounted at one end at an elevation below said support arms and having an axial opening at the other end for receiving said compression shafts and said collar therewithin, and a compression spring coaxially mounted on said compression shaft within said housing and engaging said collar proximal said other end of said housing; and (c) means for mounting a plurality of ground rollers intermediate said support arms such that each roller is independently carried on a separate pivotally mounted shaft with each roller being individually, resiliently and upwardly biased to individually contact an associated conductor.

5. In a conductor bundle stringing block having a main frame which supports a horizontal shaft having mounted thereon a plurality of conductor stringing sheaves in axial alignment with a centrally disposed hauling line sheave, a grounding apparatus comprising:

(a) a pair of support arms pivotally mounted to said main frame and extending outwardly beyond the periphery of said sheaves; and (b) means for resiliently biasing said support arms upwardly including compression shafts pivotally mounted to said main frame at an elevation above said support arms, a yoke slidably engaging each of said compression shafts and pivotally connected to said support arms proximal said main frame, a compression collar coaxially affixed to each of said shafts proximal the free end thereof, and a compression spring coaxially mounted on each of said shafts between said yoke and said collar.

6. In a conductor bundle stringing block having a main frame which supports a horizontal shaft having mounted thereon a plurality of conductor stringing sheaves in axial alignment with a centrally disposed hauling line sheave, a grounding apparatus comprising:

(a) a pair of support arms pivotally mounted to said main frame and extending outwardly beyond the periphery of said sheaves;

(b) means for resiliently biasing said support arm upwardly; and (c) means for mounting a plurality of ground rollers including a mounting bar rigidly affixed between said support arms, a plurality of ground roller frames pivotally mounted to said mounting bar and having a roller shaft therein for rotatably supporting said rollers, a plurality of bushings each rigidly mounted coaxially on said mounting rod inside one of said support frames and having a radial spring arm extending therefrom with each of said bushings also having a radially extending tab on each end thereof co-planar with said spring arm, a pair of inwardly extending angularly spaced stops formed on the inside of said frames adjacent said bushings and engageable with said tabs to limit pivotal motion of said frame to a predetermined arc, and a tension spring attached at one end to said spring arm and attached at the other end thereof to said frame such that said frame is urged upwardly about said mounting bar whereby each roller is resiliently and upwardly biased to individually contact an associated conductor.

* * * * *